United States Patent [19]

Yamashita et al.

[11] 4,273,054
[45] Jun. 16, 1981

[54] VEHICLE VIBRATION DAMPING METHOD IN THE INDUCED REPULSION TYPE MAGNETICALLY SUSPENDED RAILWAY VEHICLE

[75] Inventors: Hiroshi Yamashita, Yokohama; Takehiko Iwahana, Hachioji; Shunsuke Fujiwara, Musashino, all of Japan

[73] Assignee: Japanese National Railways, Tokyo, Japan

[21] Appl. No.: 865,724

[22] Filed: Dec. 29, 1977

[30] Foreign Application Priority Data

Jan. 18, 1977 [JP] Japan .................................. 52-3587
Jan. 18, 1977 [JP] Japan .................................. 52-3588
Jan. 18, 1977 [JP] Japan .................................. 52-3589

[51] Int. Cl.³ ............................................. B61B 3/00
[52] U.S. Cl. .................................................. 104/281
[58] Field of Search ............ 104/148 MS, 134, 23 FS, 104/148 SS, 281; 308/10

[56] References Cited

U.S. PATENT DOCUMENTS

| | | | |
|---|---|---|---|
| 3,158,765 | 11/1964 | Polgreen | 104/148 MS |
| 3,828,686 | 8/1974 | Steenbeck et al. | 104/148 MS |
| 3,858,521 | 1/1975 | Atherton | 104/148 MS |
| 3,867,886 | 2/1975 | Maki | 104/148 SS |
| 3,871,301 | 3/1975 | Kolm et al. | 104/148 SS |
| 3,890,906 | 6/1975 | Maki | 104/148 MS |
| 3,903,809 | 9/1975 | Mievicke et al. | 104/148 SS |
| 3,913,493 | 10/1975 | Maki et al. | 104/148 MS |
| 4,027,597 | 6/1977 | Lang | 104/148 MS |

FOREIGN PATENT DOCUMENTS

2612581 9/1977 Fed. Rep. of Germany ... 104/148 MS

*Primary Examiner*—Leslie J. Paperner
*Assistant Examiner*—L. E. Williams
*Attorney, Agent, or Firm*—Wenderoth, Lind & Ponack

[57] ABSTRACT

In an induced repulsion type magnetic suspension system for a railway vehicle, superconductive magnets of opposite polarities are alternately set at specific intervals in the longitudinal direction of vehicle, while in the longitudinal direction of the track conductive loop coils or conductive sheets are continuously set at specific intervals, whereby the repulsion due to the eddy current caused by a voltage induced in said conductive loop coils or conductive sheets by the superconductive magnets and said superconductive magnets levitates the vehicle. In this invention, an additional source to produce a magnetic field of the same polarity is provided on the vehicle; and thereby a magnetic flux with the same period as the vehicle vibration is applied which intersects said conductive loop coils or conductive sheets on the ground when the vehicle vibrates. Thus an induced current is produced by the magnetic flux and, using the magnetic force developed by this induced current and the magnetic source of the same polarity, the vibration of the running vehicle can be damped.

10 Claims, 26 Drawing Figures

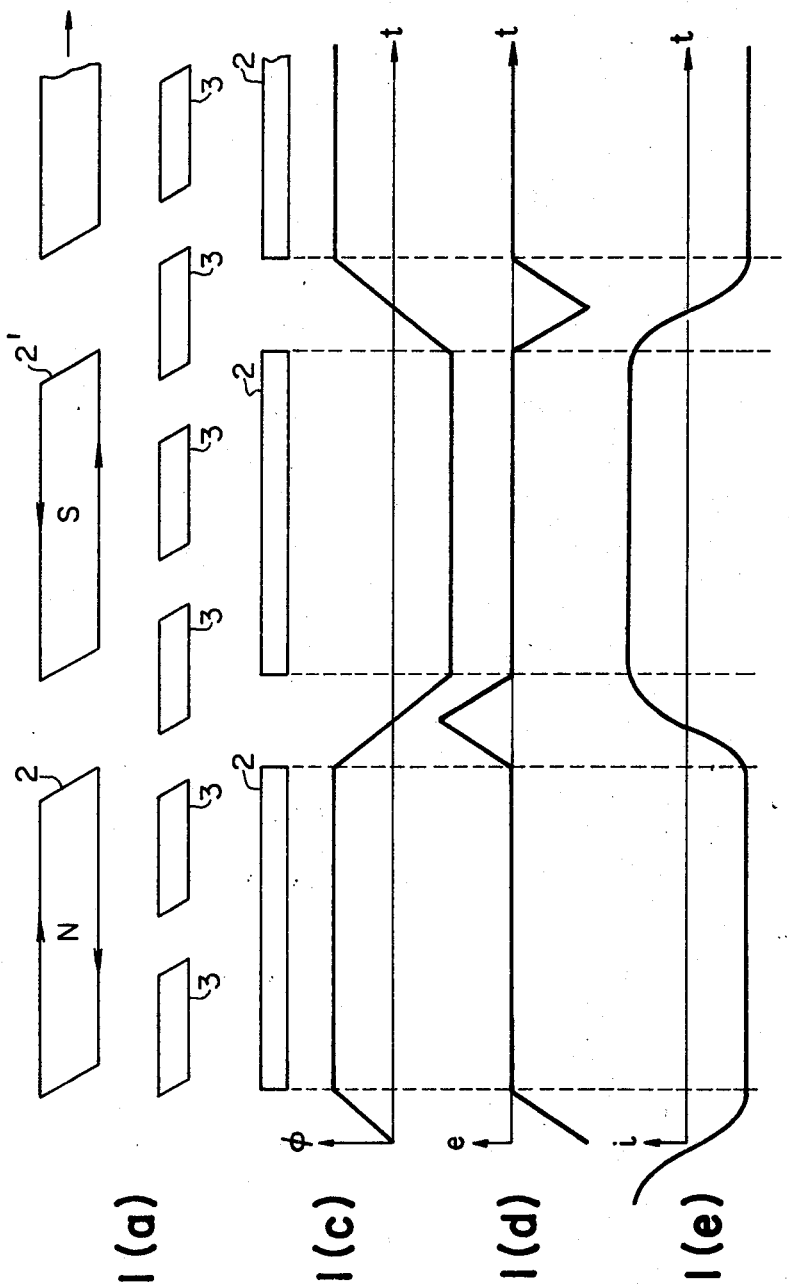

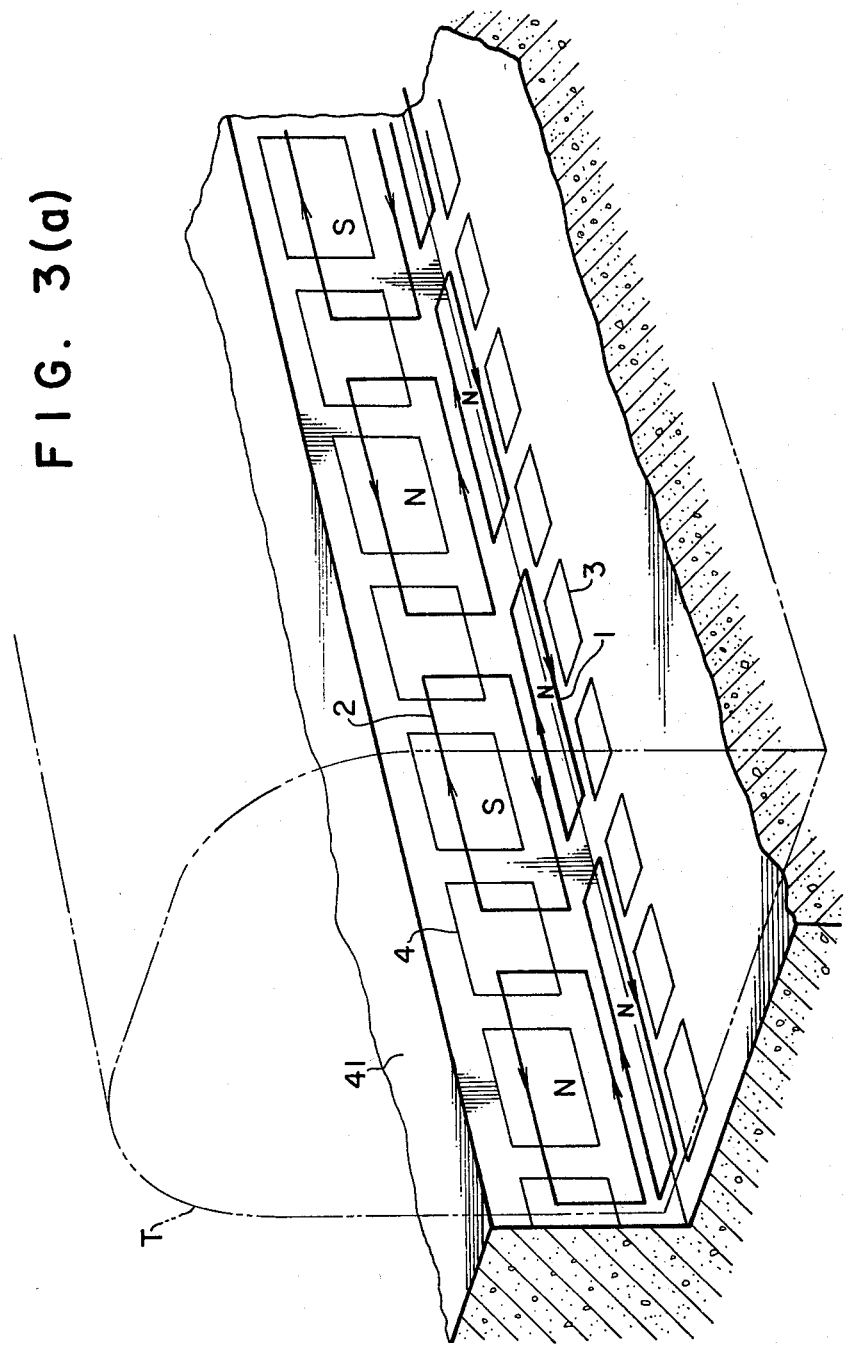

$\phi' = \phi - \Delta\phi$

VEHICLE VIBRATION DAMPING METHOD IN THE INDUCED REPULSION TYPE MAGNETICALLY SUSPENDED RAILWAY VEHICLE

BACKGROUND OF THE INVENTION

The present invention relates to a vibration-damping method for an induced repulsion type magnetic suspension system for a railway vehicle.

In an induced repulsion type magnetic suspension system for a railway vehicle in which each vehicle in a train carries superconductive magnets mounted in the longitudinal direction and the train is levitated by the repulsion taking place due to the eddy current induced by the running train in the conductive loop coils or conductive sheets laid in the track (thereafter simply represented by conductive loop coils) and said superconductive magnets on the vehicle, an additional magnetic source of the same polarity is provided to apply a magnetic flux of the same period as the vehicle vibration across said conductive loop coils when the vehicle vibrates and thereby an induced current is produced by said magnetic flux. Utilizing the magnetic force developed by this induced current and said magnetic source of same polarity, the vehicle vibration can be damped.

DESCRIPTION OF THE PRIOR ART

An induced repulsion type magnetic suspension system for a railway vehicle is known in the prior art, in which each vehicle in a train carries superconductive magnets mounted in the longitudinal direction of the vehicle and the train is levitated and guided by the repulsion taking place due to the eddy currents induced, when the train runs, in the conductive loop coils on the track and said superconductive magnets on the vehicle.

The principle of this system will be described referring to FIGS. 1(a)-(2) to an extent necessary for the understanding of the present invention.

In FIGS. 1(a) and 1(b), a known superconductive magnet 2 is a conductor designed in a loop form. A number of them are arranged beneath the body of each vehicle in the train at specific intervals in the running direction of train, and such that the polarities of adjacent magnets are opposite to each other. Meanwhile, on the tracks are placed known conductive loop coils or conductive sheets 3 in such positions that magnetic induction can take place between said magnetics 2 and said coils or sheets 3.

Even with this arrangement no magnetic action will occur between the magnet 2 and the coil 3, so long as the train is at rest. When the train is driven by a vehicle-mounted drive mechanism, for example, a known linear motor, each superconductive magnet 2 moves over the conductive loop coils 3 at specific intervals on the track in the running direction of train. Thus, an induced current flows in the conductive loop coils 3, provided that one superconductive magnet 2 and another 2' located ahead in the running direction do not face the same conductive loop coil 3 at the same time. This induced current increases as the running speed of the train increases; at a certain speed, say, about 200 km/h, it nearly saturates; and so long as this speed or a greater speed is maintained, said current remains at the same level. Namely, the conductive loop coil 3 illustrated in FIG. 1(a) is crossed by a magnetic flux $\phi$ depicted in FIG. 1(c) at the corresponding position and thereby a levitating voltage e depicted in FIG. 1(d) is induced at the corresponding position, causing an eddy current i indicated in FIG. 1(e) to flow. It is well-known that the direction of a current induced in an opposed second loop conductor by the current flowing in a first loop conductor is opposite to the direction of the current in the first conductor. Therefore if the current in the superconductive magnet 2 flows in the direction a of the arrow as indicated in FIG. 1(f), the current induced in the conductive loop coil 3 by this current will flow in the direction b. Thus according to Fleming's left hand law a levitation force $F = i \times B$ is produced, where B is the density of the magnetic flux produced by the magnet 2 and i is the eddy current produced by the conductive loop coil 3. Thus, the train can be levitated and guided by the repulsion taking place due to the current flowing in the magnet 2 and the eddy current induced in the coil 3 by the magnet 2. In FIGS. 1(c)-1(e), t denotes time.

In this system, the starting and stopping of the train including powering, coasting and braking are carried out by a vehicle drive device, say, a known linear motor mounted on the vehicle. When said device starts the vehicle, as illustrated in FIG. 2 a levitation force is developed by the interaction of the superconductive magnet 2 and the conductive loop coil 3 and when the vehicle reaches a certain speed and thereafter, the levitation force is kept nearly constant as the vehicle is driven. When the running speed drops to a certain level as the vehicle is decelerated, being braked by said drive device, during this deceleration the levitation force gradually drops, finally causing the vehicle to land on the ground on an auxiliary support means such as wheels.

In such a system, if the gap between the vehicle-mounted superconductive magnet 2 and the conductive loop coils 3 positioned on the track in the longitudinal direction is designed to be always constant, the train will be levitated at a constant level so long as it runs at more than a specified speed. Irregularity of the track surface is, however, unavoidable, because it is practically impossible to make the track perfectly flat over a long distance and to maintain it flat and because it is common practice to set the track on curves at a different level from the track on the straightaway. On the part of track with such irregularity, the gap between the magnets 2 and the coils 3 will naturally change and in consequence the magnetic force between the magnets 2 and the coils 3 will change too, resulting in a vibration of the vehicle. An increased irregularity of the track will cause an increased vibration of vehicle, involving the hazard that the vehicle will contact the track and cause a disastrous accident. Even if such an accident is averted, such an increased vibration causes decreased riding comfort, which will adversely affect the suitability of the system as transport means. External disturbances, such as wind, are also likely to cause such a vibration of the vehicle.

The following methods have been proposed to damp such vibration. One of them is what might be called a passive damping. As described later, the superconductive magnet is housed in a cryostat when mounted on the vehicle. In this method said vibration is damped by constituting the outer casing of said cryostat by a conductive sheet or by attaching a conductive sheet as a damper sheet to the outer casing of said cryostat. This method, however, utilizes as the damping force a magnetic force caused by the eddy current induced in the conductive loop coil 3 on the ground (this current possesses a magnetomotive force equal to about 10-20% of the magnetomotive force of the superconductive magnet 2) and the eddy current induced in said damper sheet by the eddy current in the ground coil 3 as the vehicle vibrates. Therefore, the damping time constant to damp a vibration of, say, magnitude 1 to an amplitude of 1/e ($\approx$0.37) will be about 1-2 seconds and it is difficult to reduce this value to less than 1 second. Thus the damping effect obtainable from this method is poor.

Another method is the so-called active damping, in which a damping coil is attached to the bottom or side of the cryostat housing the superconductive magnet 2; the displacement of the running vehicle is detected; and a damping current corresponding to this displacement is applied to said damping coil, whereby the magnetic force developed between said damping coil and the opposed conductive loop coil on the ground is utilized to damp the vehicle vibration. This method has the advantage in that any displacement can be well damped by providing a sufficient power supply on the vehicle, but because it requires the use of a displacement sensor, an arithmetic device, control device, an on-board power source, and the damping coil to be mounted on the vehicle, the system reliability is inevitably decreased; besides, the capacity of the power source has to be large. Thus the advantage of the induced repulsion type magnetic suspension system for a railway vehicle which needs no large-capacity power plant on the vehicle is substantially lost.

OBJECTS AND BRIEF SUMMARY OF THE INVENTION

The first object of the present invention is thus to provide a method and apparatus for damping the vibration of a vehicle in an induced repulsion type magnetic suspension system for a railway vehicle, by which not only the vehicle vibration due to any irregularity of track can be effectively damped, thereby preventing an accidental contact of the vehicle with the track, but also the train can be operated with good riding comfort.

The second object of the present invention is to provide a simple and highly reliable method and apparatus for damping the vibration of the vehicle in an induced repulsion type magnetic suspension system for a railway vehicle, by which the damping can be achieved while the full advantage of this system is retained, without any substantial increase in the overall weight of the vehicle, i.e., without the necessity to provide on the vehicle a device to detect the vibration of the running vehicle, an arithmetic device, a device to control the detected displacement of the vehicle and a power source for control of vibration.

The third object of the present invention is to provide an effective method and apparatus for damping the vibration of the vehicle due to the track irregularity and other causes without adversely affecting the magnetic levitation effect of this system, said method being active only when such a vehicle vibration due to an external disturbance occurs and being inactive when there is no vibration. These objects can be easily attained by the present invention.

The present invention is constituted as follows.

Superconductive magnets are mounted on each vehicle of a train in the longitudinal direction thereof and when the train runs, an eddy current is induced in the conductive loop coils laid in the track, whereby the repulsion taking place between this eddy current and said superconductive magnets on the vehicle is utilized to levitate or guide the train. In such an induced repulsion type magnetic railway vehicle suspension system, an additional means is provided on the vehicle to produce a magnetic field of the same polarity and a magnetic flux of the same period of the vehicle vibration is applied therefrom to the conductive loop coils on the ground when the vehicle vibrates due to track irregularities, thereby producing an induced current in the ground coils; and utilizing the magnetic force developed by this induced current and said magnetic source of the same polarity, the vehicle vibration can be damped.

In the present invention, for the purpose of producing the induced current in the conductive loop coil it is preferable to provide, in addition to the superconductive magnets for levitation and guiding, superconductive damping magnets of the same polarity at specific intervals on the vehicle in the longitudinal direction so that, while the vehicle is running, the magnetic field produced by the superconductive magnets for levitation and guiding will be distorted.

More preferably, the field of the levitation superconductive magnet can be distorted by increasing a definite current in the same direction in the respective magnets for levitation and guiding. Here the field distortion caused by increasing the magnetomotive force in the superconductive magnet of one polarity by a certain amount causes the magnetomotive force in the superconductive magnet of the other polarity to be decreased correspondingly.

The other objects, features and advantages of the present invention will become more apparent from the following detailed description made in conjunction with the attached drawings.

BRIEF DESCRIPTION OF THE DRAWINGS

In the attached drawings.

FIG. 3(a) is a partial fragmentary perspective view showing the basic configuration of one embodiment of the present invention;

DETAILED DESCRIPTION OF THE INVENTION

Figure 1B:
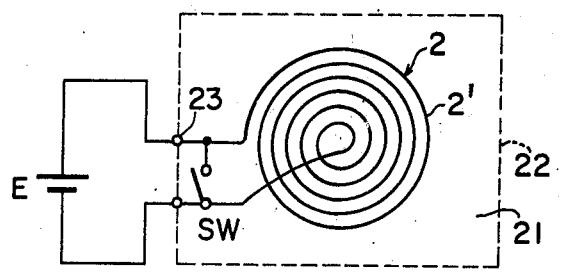
FIGS. 1(a)-1(e) are diagrams for explaining the working principle of an induced repulsion type magnetic suspension system for a railway vehicle, FIG. 1(a) being a diagrammatic perspective view illustrating the relation between the vehicle-mounted superconductive magnet and the conductive loop coil on the track, FIG. 1(b) being a plan view illustrating the configuration of the superconductive magnet, FIG. 1(c) being a diagram illustrating the magnetic flux induced in the conductive loop coil by the arrangement of FIG. 1(a), FIG. 1(d) being a diagram illustrating the voltage produced by the magnetic flux in FIG. 1(c), FIG. 1(e) being a diagram illustrating the current produced by the voltage in FIG. 1(d), and FIG. 1(f) being a sectional view indicating the direction of current flowing in the levitation superconductive magnet and in the conductive loop coil.
Figure 1F:
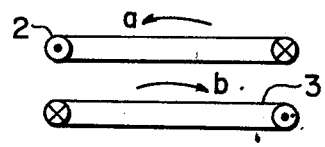
Figure 2:
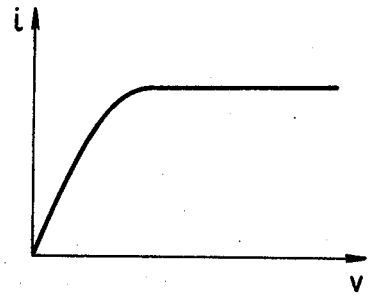
FIG. 2 is a diagram illustrating the relation between running speed and magnetic levitation in a magnetically-levitated vehicle of the induced repulsion type.

In FIG. 3, the conductive loop coils 3 are positioned on the track at specific intervals in the longitudinal direction. The loop coils can be replaced by conductive sheets. The guiding conductive loop coils 4 or conductive sheets (hereafter simply guiding conductive loop coils) are attached at specific intervals on the inside of the walls 41 and 41' along both sides of the track on which said levitation conductive loop coil 3 are installed. Said walls 41 and 41' are spaced from each other such that when the vehicle runs over the track, the faces of said walls opposed to the vehicle will remain at a specific distance from the vehicle. A superconductive magnet 2 is mounted beneath the vehicle. Said magnet 2 is conventional in the prior art. It is, for instance, constituted by a coil-like conductor as illustrated in FIG. 1(b) and is housed in a cryostat 22 filled with liquid helium 21. The superconductive magnet 2 is, for instance, designed as follows; after being housed in the cryostat 22, the coil 2' of the magnet 2 is supplied with a specific current from the power source E while, the switch SW is open as illustrated in FIG. 1(b); thereafter, the switch SW is closed to short circuit the coil 2'; and then the circuit between the switch SW and the power source E is disconnected at 23.

Figure 3B:
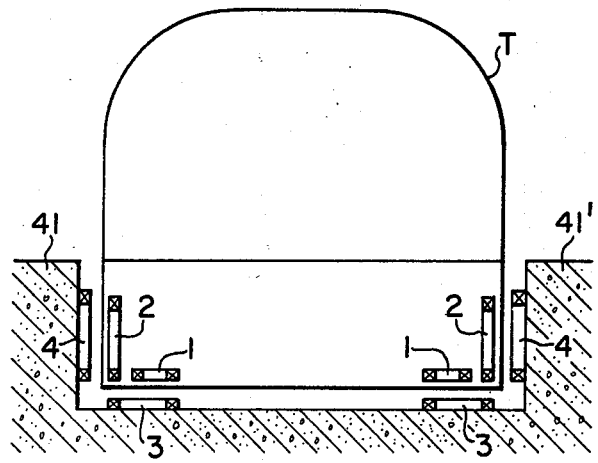
FIG. 3(b) is a sectional view of the embodiment in FIG. 3(a) with the vehicle also being depicted.

The superconductive magnet 2, the levitation conductive loop coil 3 and the guiding conductive loop coil 4 are arranged in the relationship as illustrated in FIGS. 3(a) and 3(b). The superconductive magnets 2 are positioned on both sides of the bottom of the vehicle T. In the levitated state of vehicle the lower edges of said magnets 2 are opposed to the side edges of the levitation conductive loop coils 3 positioned on both sides of track at a specific distance therefrom. In the levitated state of vehicle the superconductive magnets 2 and the guiding conductive loop coils 4 attached to the walls 41 and 41' are nearly overlappingly opposed at a specific distance from each other. The vehicle-mounted superconductive magnets 2 are arranged in the longitudinal direction of vehicle in the sequence of N-S-N-S, i.e., the adjacent magnets are of polarity to each other. By the induced repulsion between said magnets 2 and said conductive loop coils 3 and 4, the vehicle T is levitated and guided. Thus, when the vehicle is driven by, say, a linear motor (not shown), the vehicle T is levitated and guided as its running speed increases; and after a certain speed is attained, the vehicle continues to run at a specific level of levitation.

This system, which requires no large-capacity power source for levitation of the vehicle and accordingly can support the vehicle weight by a simple system, is an excellent one for vehicle levitation. As pointed out in the above, however, this system has a drawback of inability to compensate for outside influences such as the irregularity of the level of the track.

In this invention, for the purpose of eliminating this drawback, a magnetic flux of the same period as the vehicle vibration is applied from the vehicle, intersecting the conductive loop coils along the track, whereby any vehicle vibration caused by track irregularity can be damped by the magnetomotive force of the current induced by said magnetic flux.

Now a preferred means to produce an induced current for damping the vibration in the conductive loop coil will be described.

In the first example illustrated in FIGS. 3(a) and 3(b), a damping superconductive magnet 1 is provided on the vehicle in addition to the magnet 2. Such damping magnets 1 are provided on the bottom of the vehicled T in the longitudinal direction thereof at specific intervals in such fashion that at least some of them will be opposite to the conductive loop coils along the track. The outside edge of the superconductive magnet 1 is spaced at a specific distance from the bottom edge of the superconductive magnet 2; these two kinds of magnets are arranged at such positions and their longitudinal lengths are approximately equal. Whereas the adjacent levitation magnets 2 are reversed in polarity with respect to each other, such as N-S-N-S, the damping magnets 1 all have the same in polarity, for instance, N.

Figure 4A:
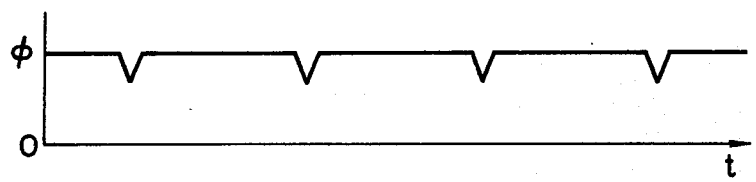
FIG. 4(a) is a diagram illustrating a magnetic flux induced in the conductive loop coil on the track by the damping superconductive magnet according to the present invention.

With such an arrangement, if there is no track irregularity, the vehicle can run so as to maintain a constant gap between the vehicle-mounted superconductive magnet 2 and the conductive loop coils 3 on the track. Thus in the levitation conductive loop coil 3 an eddy current is induced, as illustrated in FIG. 1(e), by an alternate interlinkage flux produced by the moving magnets 2, thereby developing a levitation force with the magnet 2, which holds the train in a levitated state. Meanwhile, an interlinkage flux is induced in the levitation conductive loop coil 3 by the magnet 1, as illustrated in FIG. 4(a). This magnetic flux can be split into the d-c magnetic flux component $\phi$ shown in FIG. 4(c) (i. e., the component obtained by subtracting $\Delta\phi$ of FIG. 4(b) from $\phi$ of FIG. 4(a) and the alternating magnetic flux component $\Delta\phi$ shown in FIG. 4(b).

Figure 4B:
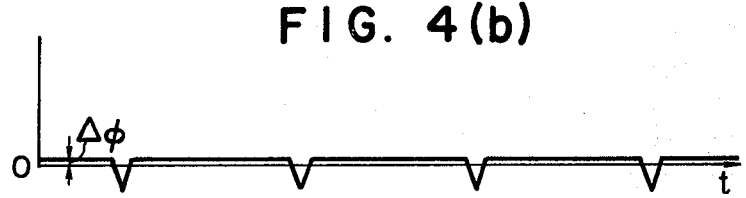
FIGS. 4(b) and 4(c) are diagrams illustrating magnetic fluxes which together constitute the magnetic flux shown in FIG. 4(a)

The alternating magnetic flux component $\Delta\phi$ shown in FIG. 4(b) is added to the alternating interlinkage flux 1c produced in the conductive loop coil 3 on the track by the superconductive magnet 2 as shown in FIG. 1(c), thereby contributing to the levitation force, but the component $\Delta\phi$ is so small as compared with the flux 1c that it can practically be neglected.

Figure 4C:
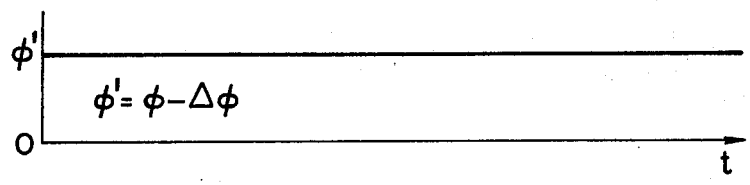

Meanwhile, the d-c magnetic flux component shown in FIG. 4(c) will not be induced in the levitation conductive loop coil 3 unless there is an irregularity in the track. The reason is that as long as a specific gap is maintained, there is no induction of voltage. Thus there is hardly any difference in the levitation force acting on the vehicle whether a damping superconductive magnet 1 is provided or not.

In the presence of a track irregularity, the gap between the superconductive magnet for levitation and guiding 2 and the conductive loop coils 3 on the track ceases to be constant and accordingly the magnetic force acting on the magnet 2 changes, thereby causing the vehicle to vibrate. As the result, a change of the same period as the vehicle vibration occurs in the interlinkage flux produced in the conductive loop coils 3 by the damping superconductive magnet 1, while in the conductive loop coils 3 an eddy current of a different mode from the eddy current contributing to the levitation force, and which contributes only to the magnetic spring action and the magnetic damping action, is induced and thereby a magnetic force with a damping effect is developed by the interaction between that eddy current and the damping magnet 1.

Figure 4D:
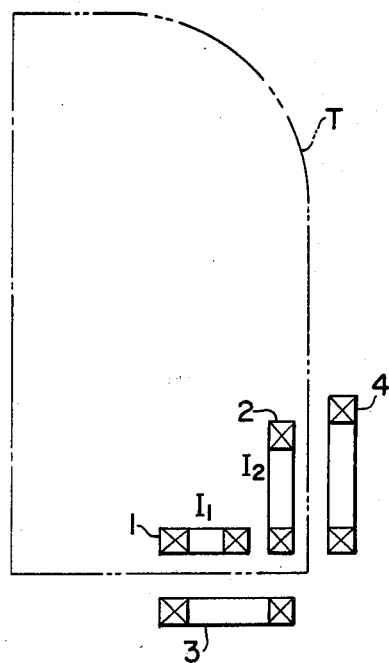
FIG. 4(d) is a sectional view for the theoretical explanation of the effect according to the present invention.

The theoretical explanation of this phenomenon will be described with reference to FIG. 4(d). In FIG. 4(d) the same symbols designate the same elements as in FIG. 3(b). It is assumed that (1) the train is running as fast as 500 km/h; (2) it hauls an infinite number of vehicles; (3) the secondary spring to support the vehicle is not considered; and (4) the train vibrates only in the vertical direction. Then it is supposed that the magnetomotive forces $I_1$ and $I_2$ of the magnets 1 and 2 are respectively distorted to $I_1'$ and $I_2''$. In that case, the levitation force Fe, the vertical magnetic spring constant $K_z$ and the vertical magnetic damping coefficient $\tau_z$ will be as follows;

$$Fe = \frac{I}{Le}(I_1 M_{13} + I_2 M_{23}) \frac{d}{dz}(I_1 M_{13} + I_2 M_{23}) \quad (1)$$

$$K_z = \frac{1}{Le}\left[-\frac{d}{dz}\left\{(I_1 M_{13} + I_2 M_{23})\frac{d}{dz}(I_1 M_{13} + I_2 M_{23})\right\} + \frac{W_z^2 \tau e^2}{W_z^2 \tau e^2 + 1}\left\{\frac{d}{dz}(I_1' M_{13} + I_2' M_{23})\right\}\right] \quad (2)$$

$$\tau_z = \frac{\tau e}{Le} \cdot \frac{1}{W_z^2 \tau e^2 + 1}\left\{\frac{d}{dz}(I_1' M_{13} + I_2' M_{23})\right\}^2$$

$$W_z^2 = K_z \cdot g/Fe$$

Where Le is the self-induction coefficient of the conductive loop coil 3; $\tau e$ is the time constant of coil 3; Wz is the angular frequency of vertical vibration; g is the gravitational acceleration; $M_{13}$ is the mutual inductance coefficient between superconductive magnet 1 and conductive loop coil 3; $M_{23}$ is the mutual inductance coefficient between superconductive magnet 2 and conductive loop coil 3. Therefore the damping time constant of vertical vibration can be expressed as follows;

$$\tau_z = \frac{2Fe}{\tau z \cdot g} = -\frac{2}{g} \cdot \frac{W_z^2 \tau e^2 + 1}{\tau e} \cdot$$

-continued $$\frac{(I_1 M_{13} + I_2 M_{23})\frac{d}{dz}(I_1 M_{13} + I_2 M_{23})}{\left\{\frac{d}{dz}(I_1' M_{13} + I_2' M_{23})\right\}^2}$$

In the foregoing, the damping effect in the present invention is explained in terms of the magnetic flux component and a mathematical expression. From a standpoint of magnetic flux distribution the explanation is as follows.

Figure 6:
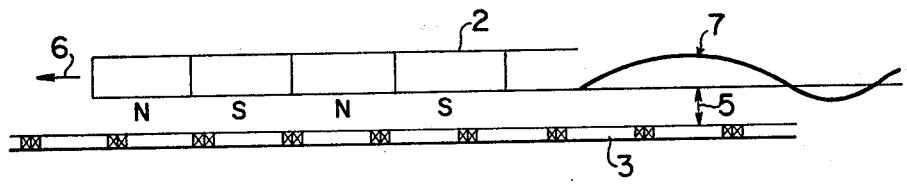
FIG. 6 is a schematic side elevation view showing the locus of levitation traced by a magnetically levitated train of the induced repulsion type.
Figure 7:
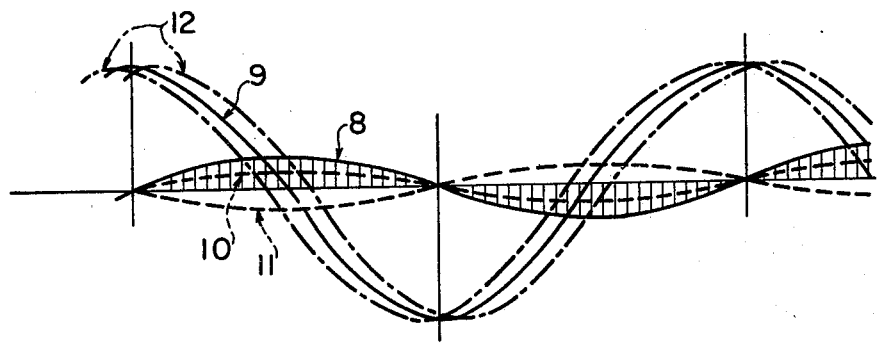
FIGS. 7 and 8 are diagrams respectively showing the magnetic flux distribution in the vehicle-mounted superconductive magnet as related to the conductive loop coil on the track and the distribution of current and voltage induced in the conductive loop coil on the track.

Now when, as illustrated in FIG. 6 a vehicle having the levitation superconductive magnets 2 mounted thereon moves in the direction of arrow 6 in a levitated state with a gap 5 maintained between the vehicle and the conductive loop coil 3 on the ground, the vertical and lateral vibrations of the vehicle follow the locus 7. Thus as the vehicle moves along, a crossing of the magnetic flux of the magnet 2 with the conductive loop coil 3 on the ground will produce an induced voltage. When only the induced voltage and the fundamental wave of magnetic flux distribution are considered, a levitation voltage 9, as shown in FIG. 7 will be produced in the conductive loop coil 3, depending on the change in the vertical component (a component normal to the direction of arrow 6) of the magnetic flux distribution 8 crossing the conductive loop coil 3 which is produced as the magnet 2 moves in the direction of arrow 6. On the other hand, the magnet 2 vibrates following the locus 7 which is normal to the moving direction; therefore the magnitude of the levitation voltage 9 changes in nearly reverse phase to the locus 7, producing a restoring force tending to move the vehicle toward the track. Further, depending on the change in the magnetic flux distribution 8 due to the vibrational velocity, a vibrational velocity voltage 10 or 11 is produced, its phase being determined by the direction of vibration, i.e., whether the magnet 2 moves toward the conductive loop coil 3 on the ground or moves away from it.

Figure 8:
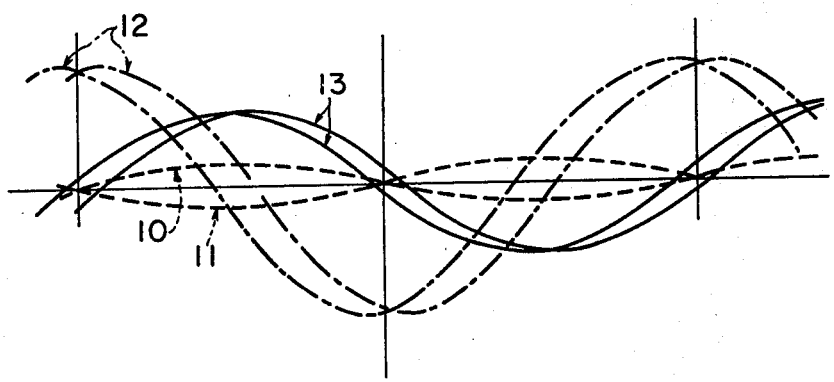

Although with the progress of vehicle the levitation voltage 9 and the vibrational velocity voltage 10 or 11 are the same or opposite depending on the polarity of the magnet 2 opposed to the conductive loop coil 3 on the ground, their frequencies are the same; in the case of a practical levitation railway it is common that the levitation voltage 9 has a far larger value than the vibrational velocity voltage 10 or 11. These two voltages 9 and 10 or 11 are combined to yield a resultant voltage 12, which causes a current 13 indicated in FIG. 8 to flow in the conductive loop coil 3 on the ground. In the case of a practical conductive loop coil 3, the phase of the current 13 lags about 90° behind that of the voltage 12. Then the vibrational velocity voltage 10 or 11 will be in the same phase as, or in the reverse phase to, the current 13. When it is in the same phase, a power loss due to the voltage 10 and the current 13 occurs in the conductive loop coil 3, whereby a magnetic force is produced which has the effect of damping the vibration of the vehicle. When it is in the reverse phase a magnetic force due to the voltage 11 and the current 13 will promote the vibration, resulting in an increased vibration, i.e., a negative damping effect.

In an induced repulsion type magnetic levitation system for a railway vehicle, the vehicle vibration due to an external disturbance like track irregularity will be repeated in the vertical or lateral direction; thus the damping effect will be alternated between positive and negative, but when the phase is considered, the effect will be rather negative in one period of vibration at a practical speed of the train.

The above is a fact which is known about the induced repulsion type magnetic levitation system for a railway vehicle, which has been experimentally confirmed by the present inventor, too.

Figure 9:
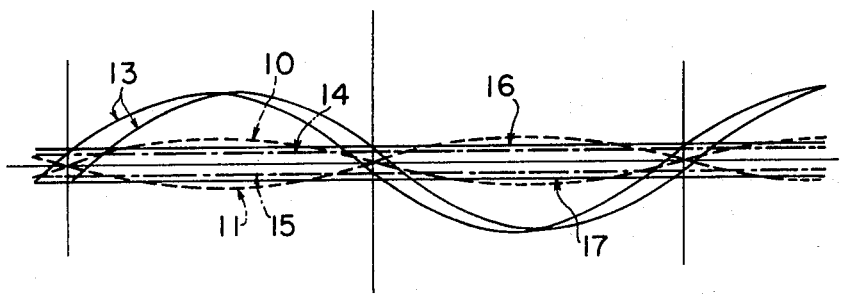
FIG. 9 is a diagram of the current distribution in FIG. 7 with the applied current in said embodiment also being depicted.

In this situation, if a vibration damping voltage 14 or 15 as shown in FIG. 9 with a different frequency is provided in addition to the vibrational velocity voltage 10 or 11 produced by vertical or lateral vibration of the vehicle, said voltage 14 or 15 causes a current 16 or 17 to flow in the conductive loop coil 3 on the ground, whereby said voltage 14 or 15 together with said current 16 or 17 will produce a power loss corresponding to the power factor in the conductive loop coil 3 and the magnetic force yielded thereby will have a vibration-damping effect. Said voltages 14 and 15 can be obtained by distorting the field of the superconductive magnet 2.

Figure 10:
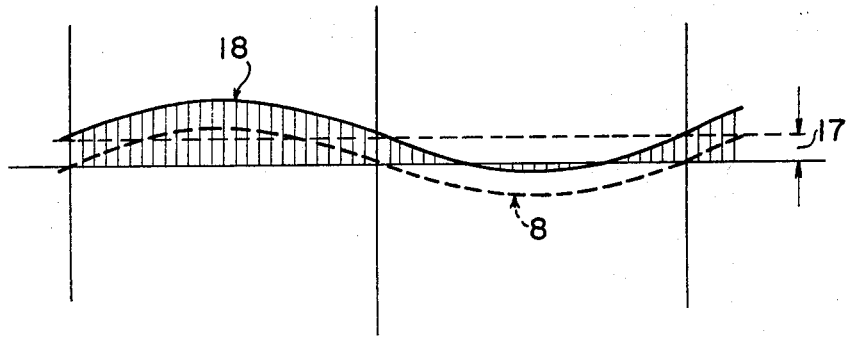
FIG. 10 is a diagram showing the effect of said embodiment in terms of magnetic flux distribution.

A magnetic flux distribution crossing the conductive loop coil 3 which will produce the current 16 or 17 of FIG. 9 will have a profile of magnetic flux distribution flux distribution 18 as shown in FIG. 10 and it can be obtained by distorting the field by a width 17 relative to the magnetic flux distribution 18. The magnetic flux distribution 18 consists of the magnetic flux distribution 18 and a d-c component with a width 17; this is substantially the same as the interlinkage flux shown in FIG. 4(a). The function of the magnetic flux distribution 18 will be described further. The levitation voltage 9 induced in the conductive loop coil 3, which is proportional to the change rate of the vertical component in the magnetic flux distribution 18, becomes equal to the levitation voltage 9 shown in FIG. 7. In this case, since the vibrational velocity voltage is proportional to the change in the horizontal component of the magnetic flux distribution 18, the vibrational velocity voltages induced will be the voltages 14 and 15 corresponding to the width 17 of the d-c component of the magnetic flux distribution 28 in addition to the voltages 10 and 11. Because the voltage 14 or 15 has a different frequency from the levitation voltage 9, said voltage 14 or 15 causes a corresponding current 16 or 17 to flow in the conductive loop coil 3 on the ground, whereby power loss resulting from a vertical or lateral vibration of the vehicle exerts a magnetic damping effect on the vehicle. The levitation voltage 9 and the vibrational velocity voltage 10 or 11 which are induced in the conductive loop coil 3 on the ground have the same frequency; therefore a damping effect cannot be expected from these voltages; and only the damping effect of the vibrational velocity voltage 14 or 15 can be active, said effect being fully active due to the strong magnetomotive force of the superconductive magnet. In other words, the principle in the above example is that a vibrational velocity voltage with a different frequency from that of the levitation voltage induced in the conductive loop coil 3 is applied, thereby consuming the vehicle vibration energy as electric energy in the conductive loop coil. Thus the damping effect is obtained.

Figure 5:
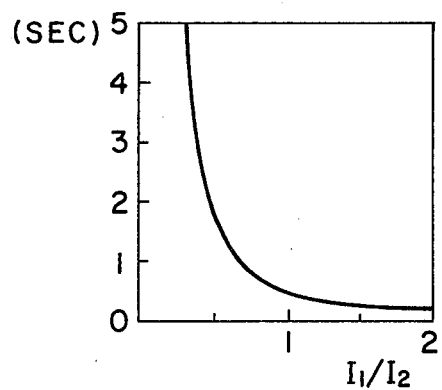
FIG. 5 is a diagram showing the effect of said embodiment.

FIG. 5 shows some of the results of calculations based on the above example, the abscissa being the ratio between the magnetomotive force $I_1$ of the damping superconductive magnet 1 and the magnetomotive force $I_2$ of the levitation superconductive magnet 2 and the ordinate being the damping time constant (sec). The levitation superconductive magnet 2 measured 28×0.6×3.15 (m), and the damping superconductive magnet 1 measured 28×0.3×3.15 (m). The conductive loop coil 3 measured 0.75×0.5×1.05 (m), its magnetomotive force $I_2$ being 500 KAT and its material being aluminum; and the vehicle weighed 35 tons.

It is seen from FIG. 5 that when the magnetomotive force $I_1$ of the damping superconductive magnet 1 is 500KAT, the damping time constant will be about 0.5 sec, which is substantially less than 1-2 sec, i.e., the damping time constant in the conventional passive damping. Thus it is understood how much the damping effect can be improved by the present invention.

The above example is for damping the vehicle vibration due to a track irregularity, etc., by distorting the magnetic flux of the levitation superconductive magnet 2 by a superconductive magnet of same polarity provided in addition to said levitation magnet 2. The same result can be attained by the following means.

In a second embodiment instead of the damping superconductive magnet 1, levitation superconductive magnets 2 with alternately reversed polarity are arranged on the vehicle at specific intervals as illustrated in FIG. 3; by increasing the current in the same direction of, say the N-pole magnet by a specific magnitude in each of said levitation magnets 2 and thereby creating a magnetomotive force of the same polarity corresponding to said current in each of said magnets 2, in other words by distorting the spatial alternate magnetic field to a specific polarity, the vehicle vibration due to track irregularity, etc., is damped.

The method of increasing the current in the same direction and by a specific magnitude in the superconductive magnets can be according to the prior art. FIGS. 11(b)-11(d) illustrate the distribution of a spatial alternate magnetic field created between vehicle-mounted levitation superconductive magnets 2 and the conductive loop coils 3 on the track in the positional relationship of FIG. 11(a), FIG. 11(b) showing a case of applying a field distortion with an amplitude $I_2$ which is smaller than the amplitude $I_1$ of the magnetomotive force of the spatial alternate magnetic force created by the levitation superconductive magnets 2 and the conductive loop coils 3, FIG. 11(c) showing a case of applying a field distortion with an amplitude $I_2$ which is larger than the amplitude $I_1$ of the magnetomotive force of the spatial alternate magnetic field and FIG. 11(d) showing a case of the amplitude $I_1$ being equal to the amplitude $I_2$.

Figure 11A:
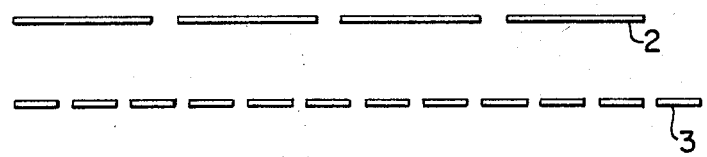
FIGS. 11(a)–11(d) are diagrams illustrating the magnetomotive force of the conductive loop coil in a second embodiment of the present invention.
Figure 11B:
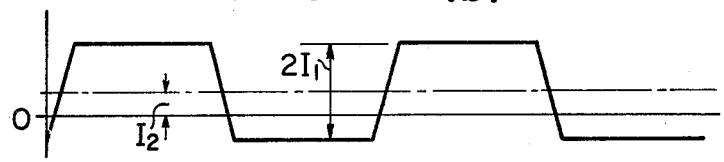
Figure 11C:
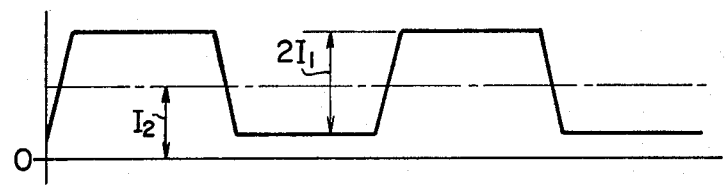
Figure 11D:
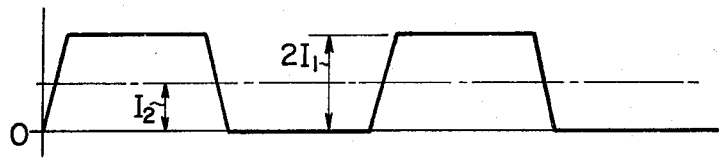
Figure 12A:
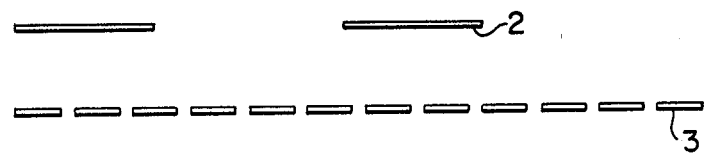
FIGS. 12(a)–12(b) are diagrams showing the situation in FIG. 11(d) in the second embodiment of the present invention.
Figure 12B:
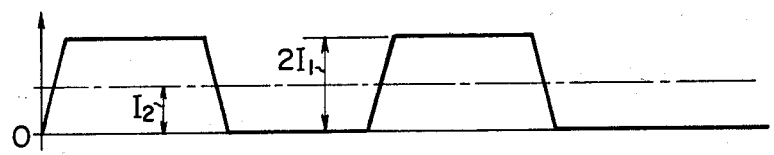

In the case of FIG. 11(d), the current at the pole of the superconductive magnet where a current in the opposite direction to the current applied for field distortion flows is cancelled. In this case, therefore, the same effect as in the arrangement of magnets in FIGS. 12(a) and 12(b) is achieved wherein the situation is such that only every other one of the magnets installed on the vehicle is active. Thus when a field distortion is applied to the superconductive magnet 2, the vehicle levitation is hardly affected in the absence of track irregularity and it remains the same as in the first embodiment; and the damping effect will appear according to the same principle as in the first embodiment, if there is a track irregularity and vehicle vibration is caused thereby.

Figure 13:
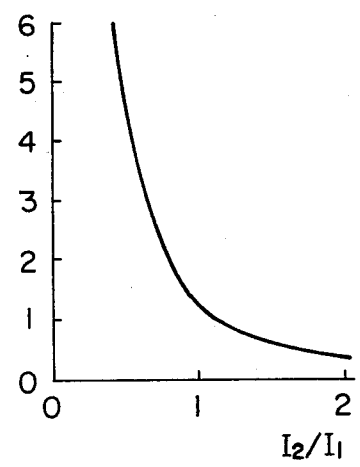
FIG. 13 is a diagram showing the effect of the second embodiment.

FIG. 13 shows a calculated example according to the second embodiment, in which the supercondutive magnets 2 of FIG. 11(a) are 1550 mm long, 300 mm wide and are at a pitch of 1800 mm; the conductive loop coils 3 on the ground are 460 mm long, 330 mm wide and are at a pitch of 676 mm; and the amplitude $I_1$ of the magnetomotive force of the alternating magnetic field in the superconductive magnet 2 is 240KAT.

Also in this case in the experimental example of the first embodiment described in connection with FIG. 5, it is assumed that (1) the train is running as fast as 500 km/h; (2) is hauls an infinite number of vehicles; (3) the secondary spring to support the vehicle is not considered; and (4) the train vibrates only in the vertical direction. FIG. 13 summarizes the experimental results, the abscissa being the ratio of the distorted magnetomotive force $I_2$ to the amplitude $I_1$ of the magnetomotive force in the alternating magnetic field and the ordinate being the damping time constant.

As is evident from FIG. 13, the damping time constant will be slightly less than 0.4 sec for a degree of distortion $I_2/I_1=2$. Thus a far better damping effect than achieved by the conventional method of passive damping can be obtained.

The above description is of the damping of the vehicle levitation system. As for the vehicle vibration in lateral direction, this lateral vibration can also be damped to the same extent as the vibration of the above-described levitation system by, as illustrated in FIG. 3(b), distorting the spatial alternate magnetic field between the magnet 2 and the guiding loop coil 4 of the same configuration as the loop coil 3 on the ground by the damping magnet 1, or by increasing a current in a specific direction in each of the superconductive magnets 2 and thereby distorting said spatial alternate magnetic field. Depending on the arrangement of the superconductive magnets, a superconductive magnet which is opposed to some of the guiding conductive loop coils may, if necessary, be provided separately from the superconductive magnet 2, thereby to damp the lateral vibration.

The advantages of the present invention are as follows;

(1) In the induced repulsion type magnetic levitation system, merely by increasing a current of in a specific direction and magnitude in each of the vehicle-mounted superconductive magnets for levitation and guiding or merely by arranging at specific intervals in the longitudinal direction of the vehicle superconductive magnets for damping with the same polarity in addition to said magnets for levitation and guiding, a more efficient damping effect than by the conventional method can be obtained. Thus the damping method according to the present invention is a highly desirable one for an induced repulsion type magnetic levitation system for a railway vehicle in which the vehicle weight is not substantially increased.

(2) The configuration itself is very much simplified as compared with the conventional active damping; and accordingly an extremely high reliability is assured.

(3) The damping effect achieved is so high that the damping time constant is as short as about 0.4 sec as compared with 1-2 sec in the conventional passive damping method.

What is claimed is:

1. Vehicle vibration damping means for an induced repulsion type magnetic levitation system for railway vehicles, said system having superconductive levitating magnets with alternate opposite polarity positioned at specific intervals longitudinally of the vehicle and conductive loop coils or conductive sheets on the track at specific intervals in the direction of travel of the vehicle, and the vehicle is levitated by the repulsion taking place due to said superconductive magnets and the eddy currents produced by the voltage induced in said loop coils by the flux from said magnets when the vehicle runs at a specified speed, said vibration damping means comprising means on the vehicle for constantly applying a magnetic flux in one direction and of a specific magnitude to said conductive loop coils from the vehicle, said flux being in addition to the levitation flux, for producing a damping magnetic force on said vehicle as a result of the current induced in the conductive loop coils or conductive sheets by said additional magnetic flux for damping the vibrations of the vehicle.

2. Vehicle vibration damping means as claimed in claim 1 wherein said additional magnetic flux applying means is damping superconductive magnets having the same polarity and positioned on the vehicle at specific intervals in the longitudinal direction of the vehicle and in positions opposed to said loops coils or conductive sheets, for producing a damping magnetic force between the damping superconductive magnets and the conductive loop coils or conductive sheets.

3. Vehicle vibration damping means as claimed in claim 1 in which said superconductive magnets are magnets with superconductive coils and levitating current flowing in said coils, and said additional magnetic flux applying means is means for supplying a damping current in one direction and of a specific magnitude to each of the vehicle-mounted superconductive magnets in addition to the levitating current in the superconductive magnets for producing a damping magnetic force between said magnets and said conductive loop coils or conductive sheets.

4. Vehicle vibration damping means for an induced repulsion type magnetic levitation system for railway vehicles, said system having superconductive guiding magnets with alternate opposite polarity positioned at specific intervals longitudinally of the vehicle and conductive loop coils or conductive sheets along the track at specific intervals in the direction of travel of the vehicle, and the vehicle is guided by the repulsion taking place due to said superconductive magnets and the eddy currents produced by the voltage induced in said loop coils by the flux from said magnets when the vehicle runs at a specified speed, said vibration damping means comprising means on the vehicle for applying a magnetic flux in one direction and of a specific magnitude to said conductive loop coils from the vehicle, said flux being in addition to the guiding flux, for producing a damping magnetic force on said vehicle as a result of the current induced in the conductive loop coils or conductive sheets by said additional magnetic flux for damping the vibrations of the vehicle.

5. Vehicle vibration damping means as claimed in claim 4 wherein said additional magnetic flux applying means is damping superconductive magnets having the same polarity and positioned on the vehicle at specific intervals in the longitudinal direction of the vehicle and in positions opposed to said loop coils or conductive sheets, for producing a damping magnetic force between the damping superconductive magnets and the conductive loop coils or conductive sheets.

6. Vehicle vibration damping means as claimed in claim 5 in which said superconductive magnets are magnets with superconductive coils and guiding current flowing in said coils, and said additional magnetic flux applying means is means for supplying a damping current in one direction and of a specific magnitude to each of the vehicle-mounted superconductive magnets in addition to the guiding current in the superconductive magnets for producing a damping magnetic force between said magnets and said conductive loop coils or conductive sheets.

7. Vehicle vibration damping means for an induced repulsion type magnetic levitation system for railway vehicles, said system having superconductive levitating magnets and supercondutive guiding magnets with alternate opposite polarity positioned at specific intervals longitudinally of the vehicle and conductive loop coils or conductive sheets on and along the track at specific intervals in the direction of travel of the vehicle, and the vehicle is levitated and guided by the repulsion taking place due to said superconductive magnets and the eddy currents produced by the voltage induced in said loop coils by the flux from said magnets when the vehicle runs at a specified speed, said vibration damping means comprising means on the vehicle for applying a magnetic flux in one direction and of a specific magnitude to said conductive loop coils from the vehicle, said flux being in addition to the levitation and guiding flux, for producing a damping magnetic force on said vehicle as a result of the current induced in the conductive loop coils or conductive sheets by said additional magnetic flux for damping the vibrations of the vehicle.

8. Vehicle vibration damping means as claimed in claim 7 wherein said additional magnetic flux applying means is damping superconductive magnets having the same polarity and positioned on the vehicle at specific intervals in the longitudinal direction of the vehicle and in positions opposed to said loop coils or conductive sheets, for producing a damping magnetic force between the damping superconductive magnets and the conductive loop coils or conductive sheets.

9. Vehicle vibration damping means as claimed in claim 1 in which said superconductive magnets are magnets with superconductive coils and current flowing in said coils, and said additional magnetic flux applying means is means for supplying a damping current in one direction and of a specific magnitude to each of the vehicle-mounted superconductive magnets in addition to the current already flowing in the supercondutive magnets for producing a damping magnetic force between said magnets and said conductive loop coils or conductive sheets.

10. Vehicle vibration damping method for an induced repulsion type magnetic levitation system for railway vehicles, said system having superconductive levitating magnets and superconductive guiding magnets with alternate opposite polarity positioned at specific intervals longitudinally of the vehicle and conductive loop coils or conductive sheets on and along the track at specific intervals in the direction of travel of the vehicle, and the vehicle is levitated and guided by the repulsion taking place due to said superconductive magnets and the eddy currents produced by the voltage induced in said loop coils by the flux from said magnets when the vehicle runs at a specified speed, said vibration damping method comprising applying a magnetic flux from the vehicle in one direction and of a specific magnitude to said conductive loop coils, said flux being in addition to the levitation and guiding flux, for producing a damping magnetic force on said vehicle as a result of the current induced in the conductive loop coils or conductive sheets by said additional magnetic flux for damping the vibrations of the vehicle.

* * * * *